US009854607B1

(12) United States Patent
Chu et al.

(10) Patent No.: US 9,854,607 B1
(45) Date of Patent: Dec. 26, 2017

(54) METHOD AND APPARATUS FOR PERFORMING DYNAMIC CLEAR CHANNEL ASSESSENT (CCA), AND DISTINGUISHING WIRELESS COMMUNICATIONS AMONG DIFFERENT BASIC SERVICE SETS

(71) Applicant: Marvell International LTD., Hamilton (BM)

(72) Inventors: Liwen Chu, San Ramon, CA (US);
Hongyuan Zhang, Fremont, CA (US);
Hui-Ling Lou, Sunnyvale, CA (US);
Lei Wang, San Diego, CA (US);
Jinjing Jiang, San Jose, CT (US)

(73) Assignee: Marvell International LTD., Hamilton (BM)

( * ) Notice: Subject to any disclaimer, the term of this patent is extended or adjusted under 35 U.S.C. 154(b) by 237 days.

(21) Appl. No.: 14/617,145

(22) Filed: Feb. 9, 2015

Related U.S. Application Data

(60) Provisional application No. 61/937,832, filed on Feb. 10, 2014.

(51) Int. Cl.
*H04W 4/00* (2009.01)
*H04W 74/08* (2009.01)
(Continued)

(52) U.S. Cl.
CPC ..... *H04W 74/0816* (2013.01); *H04W 52/241* (2013.01); *H04W 72/0473* (2013.01); *H04W 84/12* (2013.01); *H04W 88/08* (2013.01)

(58) Field of Classification Search
USPC .......................... 370/329, 328, 338, 509, 510
See application file for complete search history.

(56) References Cited

U.S. PATENT DOCUMENTS

2013/0229996 A1 9/2013 Wang et al.
2014/0286203 A1 9/2014 Jindal et al.
(Continued)

FOREIGN PATENT DOCUMENTS

WO   WO-2015147874 A1   10/2015

OTHER PUBLICATIONS

"Specification of the Bluetooth System" Master Table of Contents & Compliance Requirments—Covered Core Package version: 4.0; Jun. 30, 2010; 2302 pages.
(Continued)

*Primary Examiner* — Phuongchau Ba Nguyen

(57) ABSTRACT

An access point including a receiving module to receive first information indicating whether a first device supports a dynamic clear channel assessment (CCA) capability, which includes an ability to dynamically change a CCA threshold in a frequency channel to detect whether a medium is idle or busy. A CCA module generates second information in response to receiving the first information about the first device. The second information is based on the first information and indicates a CCA method used by the access point in response to receiving the first information. A transmitting module transmits the second information in response to receiving the first information about the first device. The second information is usable by one or more devices associated with the access point in a basic service set of the access point to select respective CCA procedures to detect whether the medium is idle or busy.

19 Claims, 5 Drawing Sheets

(51) Int. Cl.
*H04W 52/24* (2009.01)
*H04W 72/04* (2009.01)
*H04W 84/12* (2009.01)
*H04W 88/08* (2009.01)

(56) References Cited

U.S. PATENT DOCUMENTS

| | | |
|---|---|---|
| 2014/0328270 A1 | 11/2014 | Zhu et al. |
| 2015/0131517 A1 | 5/2015 | Chu et al. |
| 2016/0081010 A1* | 3/2016 | Seok .......... H04W 74/0816 370/329 |

OTHER PUBLICATIONS

IEEE 802.11-14/0082r0; Improved Spatial Reuse Feasibility—Part I—Ron Porat, Nihar Jindal; Jan. 2014; 19 Pages.
IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.
IEEE 802.20-2008 "IEEE Standard for Local and metropolitan area networks: Part 20: Air Interface for Mobile Broadband Wireless Access Systems Supporting Vehicular Mobility—Physical and Media Access Control Layer Specification" IEEE Computer Society; Aug. 29, 2008; 1053 Pages.
IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.
IEEE P802.11ad/D5.0; Draft Standard for Information Technology—Telecommunicaitons and Information Exchange Between Systems—Local and Metropolicatn Area Networks—Specific Requiremnts; Part 11: Wireless LAN Medium Access Control (MAC) and Physical Layer (PHY) Specifications; Amendment 3: Enhancements for Very High Throughput in the 60 GHz Band; Sep. 2011; 601 Pages.
IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.
IEEE P802.11g/D8.2 Apr. 2003 (Supplement to Ansi/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.
IEEE Std 802.11ac/D2.0 Draft Standard for Information Technology—Telecommunications and information exchange between systems—Local and metropolitan area networks—Specific requirements—Part 11: Wireless LAN Medium Access Control (MAC) and Phsycial Layer (PHY) specification: Amendment 4: Enhancements for Very High Throughput for Operation in Bands below 6 GHz, The Institution of Electrical and Electronics Engineers, Inc., Jan. 2012; 359 Pages.
IEEE Std 802.11b-1999 (Supplement to ANSI/IEEE Std 802.11, 1999 Edition—96 pages) Supplement to IEEE Standard for Information Technology—Telecommunications and information exchange between systems—Local and metropolitan area networks—Specific requirements, Part 11: Wireless LAN Medium Access Control (MAC) and Physical Layer (PHY) specifications:96 Pages.
IEEE Std 802.11T™-2012, IEEE Standard for Information technology—Telecommunications and information exchange between systemsLocal and metropolitan area networks—Specific requirements, Part 11: Wireless LAN Medium Access Control (MAC) and Physical Layer (PHY) Specifications, Mar. 29, 2012, 2793 pages.
IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-91.
IEEE802.11-13/1012r4; Dynamic Sensititivy Control V2; Graham Smith; Nov. 2013; 29 Pages.
U.S. Appl. No. 14/961,558, filed Dec. 7, 2015, Liwen Chu.
U.S. Appl. No. 14/961,380, filed Dec. 8, 2015, Liwen Chu.
U.S. Appl. No. 14/600,766, filed Feb. 9, 2016, Yakun Sun.
U.S. Appl. No. 14/882,123, filed Dec. 7, 2015, Hongyuan Zhang.
U.S. Appl. No. 14/961,359, filed Dec. 7, 2015, Liwen Chu.
U.S. Appl. No. 14/961,512, filed Dec. 7, 2015, Liwen Chu.
U.S. Appl. No. 14/961,635, filed Dec. 7, 2015, Liwen Chu.
U.S. Appl. No. 14/963,045, filed Oct. 13, 2015, Liwen Chu.
U.S. Appl. No. 15/019,768, filed Jan. 20, 2015, Liwen Chu.
Chun et al. "Legacy Support on HEW frame structure," doc. IEEE 11-13/1057r0, The Institute of Electrical and Electronics Engineers, Inc., pp. 1-8 (Sep. 2013).
Hiertz, et al., "The IEEE 802.11 Universe," IEEE Communications Magazine, pp. 62-70, Jan. 2010.
IEEE P802.11ac/D5.0; Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz; Jan. 2013; 440 pages.
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part. 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-408 (Oct. 2012).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jul. 2013, 446 pages.
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

(56) References Cited

OTHER PUBLICATIONS

Itagaki et al., "Dynamic CCA Control and TPC Simulation Results with SS1~SS3," IEEE Draft, IEEE 802.11-15/1045r0 Submission, 54 pages (Sep. 14, 2015).
Stacey et al., "IEEE P802.11, Wireless LANs, Proposed TGac Draft Amendment," Institute of Electrical and Electronics Engineers, doc. No. IEEE 802.11-10/1361r3 (Jan. 2011), 154 pages.
Stacey et al., "Specification Framework for TGac," document No. IEEE 802.11-09/0992r20, Institute tor Electrical and Electronics Engineers, pp. 1-49, Jan. 18, 2011.
Trandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

\* cited by examiner

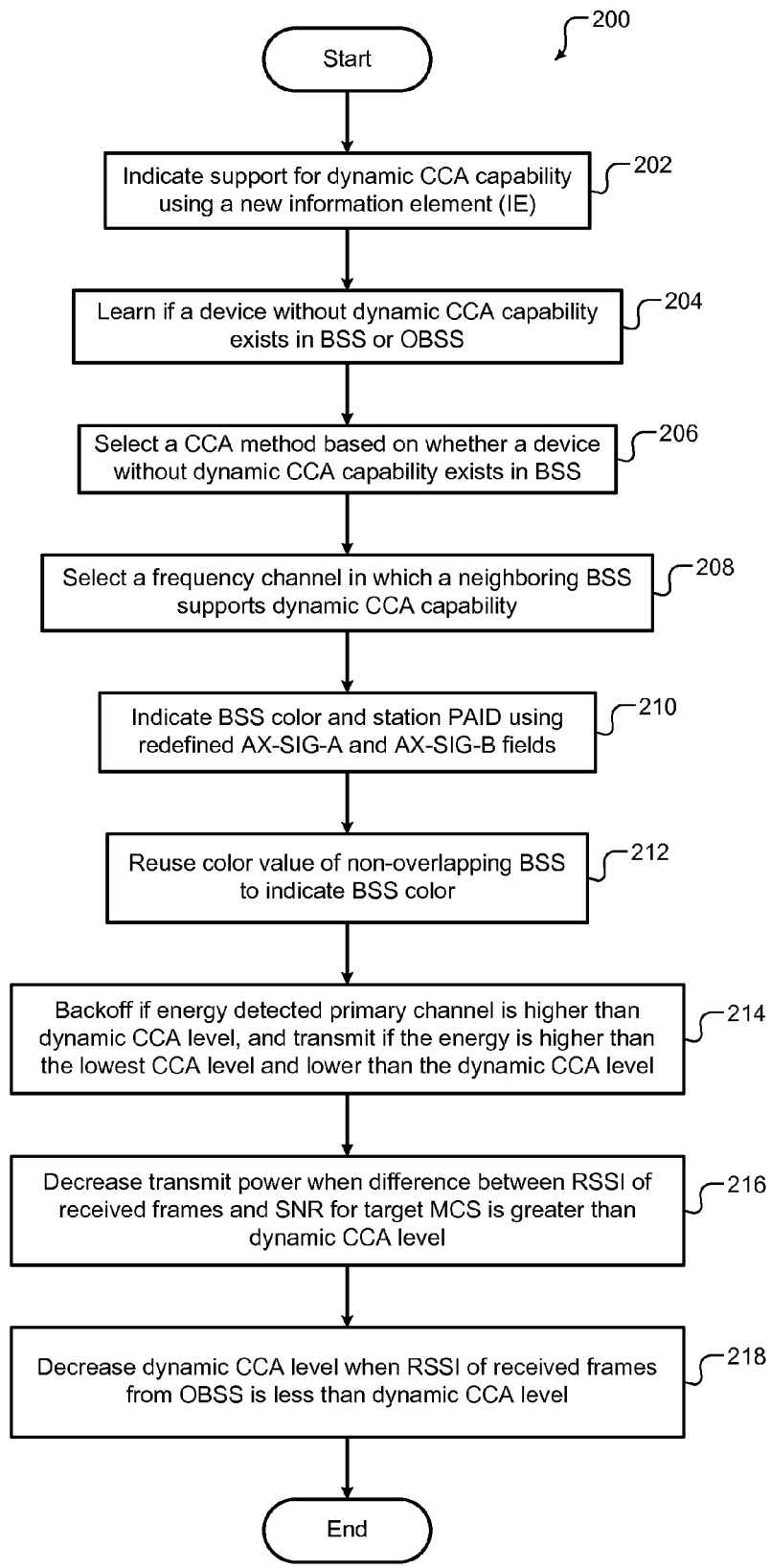

METHOD AND APPARATUS FOR PERFORMING DYNAMIC CLEAR CHANNEL ASSESSENT (CCA), AND DISTINGUISHING WIRELESS COMMUNICATIONS AMONG DIFFERENT BASIC SERVICE SETS

CROSS-REFERENCE TO RELATED APPLICATIONS

This application claims the benefit of U.S. Provisional Application No. 61/937,832, filed on Feb. 10, 2014. The entire disclosure of the application referenced above is incorporated herein by reference.

FIELD

The present disclosure relates generally to wireless communication and more particularly to high-efficiency wireless local area network (HEW) medium access control (MAC) with dynamic clear channel assessment (CCA) and basic service set (BSS) coloring.

BACKGROUND

IEEE 802.11 standard uses a carrier sense multiple access with collision avoidance (CSMA/CA) mechanism to access a wireless medium (hereinafter medium). A client station (STA) typically listens to the medium (i.e., senses the medium) before transmitting a signal on the medium. There are two methods for sensing the medium. A first method includes physical carrier sensing, which detects presence or absence of RF energy in the medium. A second method includes virtual carrier sensing, which detects presence or absence of an 802.11 signal in the medium.

A Clear Channel assessment (CCA) is a logical function in a physical layer (PHY) of a STA or an access point (AP) that determines a current state of use of the medium. For example, in wireless devices (AP/STA) that use orthogonal frequency division multiplexing (OFDM), a CCA level (threshold) for a 20 MHz channel is typically −82 dBm, and the CCA level (threshold) for a 40 MHz channel is typically −79 dBm. If an energy level detected in a channel is less than the CCA level for the channel, the channel is considered idle, and a transmission in the channel can be attempted. If the energy level detected in the channel is greater than the CCA level for the channel, the channel is considered busy, the wireless device may backoff, and a transmission may not be attempted to avoid collisions.

Another way of minimizing collisions is to assign different color values (typically three bit identifiers in a signal field of a header of a packet) to each basic service set (BSS). Since each BSS has a different color value, a station in a BSS can know after decoding the signal field whether a detected transmission is from within its own BSS to which the station belongs or from a neighboring BSS. Transmissions that are perceived to belong to an overlapping BSS (having a different color value) deferred to by backing off based on a CCA value to avoid collisions.

SUMMARY

An access point comprises a receiving module, a clear channel assessment module, and a transmitting module. The receiving module is configured to receive first information indicating whether a first device supports a dynamic clear channel assessment capability. The dynamic clear channel assessment capability includes an ability to dynamically change a clear channel assessment threshold in a frequency channel to detect whether a medium is idle or busy. The clear channel assessment module is configured to generate second information in response to receiving the first information about the first device indicating whether the first device supports the dynamic clear channel assessment capability. The second information is based on the first information. The second information indicates a clear channel assessment method used by the access point in response to receiving the first information. The transmitting module is configured to transmit the second information in response to receiving the first information about the first device indicating whether the first device supports the dynamic clear channel assessment capability. The second information is usable by one or more devices associated with the access point in a basic service set of the access point to select respective clear channel assessment procedures to detect whether the medium is idle or busy.

In other features, the first information indicates that the first device does not support the dynamic clear channel assessment capability, and the second information indicates to the one or more devices associated with the access point in the basic service set of the access point that the one or more first devices cease using dynamic clear channel assessment.

In another feature, the transmitting module is configured to transmit the second information via an information element included in a beacon or a management frame.

In another feature, in response to the first device being a client station in the basic service set of the access point, the receiving module is configured to receive the first information via an information element included in an association request received from the client station in the basic service set of the access point.

In other features, the first device includes a station or an access point in a neighboring basic service set that overlaps with the basic service set of the access point, and the receive module is configured to receive the first information about the first device from the one or more devices in the basic service set of the access point.

In another feature, the access point further comprises a device detecting module configured to detect whether the first device, including a station or an access point in a neighboring basic service set, is configured to operate (i) in a same frequency channel as the basic service set of the access point and (ii) without using the dynamic clear channel assessment capability. The neighboring basic service set overlaps with the basic service set of the access point. The receiving module is configured to receive the first information from the device detecting module.

In other features, the second information indicates (i) a first period in a beacon interval of the access point in which the one or more devices in the basic service set of the access point having the dynamic clear channel assessment capability contend for access to the medium using dynamic clear channel assessment and (ii) a second period in the beacon interval in which the one or more devices in the basic service set of the access point not having the dynamic clear channel assessment capability contend for access to the medium.

In another feature, the second information indicates that the one or more devices in the basic service set of the access point having the dynamic clear channel assessment capability also contend for access to the medium during a time other than the first period (i) at a lower priority than the one or more devices not having the dynamic clear channel assessment capability and (ii) by using a clear channel assessment threshold of the one or more devices not having the dynamic clear channel assessment capability.

In another feature, the second information to the one or more devices associated with the access point in the basic service set of the access point that the one or more first devices are to use a predetermined dynamic clear channel assessment threshold. The predetermined dynamic clear channel assessment threshold is selected based on one or more of (i) dynamic clear channel assessment thresholds used by neighboring basic service sets and (ii) spatial reuse criteria.

In another feature, the access point further comprises a channel selecting module configured to select a frequency channel to operate the basic service set of the access point. The frequency channel is a same channel in which a neighboring basic service set operates using the dynamic clear channel assessment capability.

In another feature, the channel selecting module is configured to select a different frequency channel in response to the first information indicating that the first device does not support the dynamic clear channel assessment capability.

In another feature, the access point further comprises a header generating module configured to generate a header for a physical layer protocol data unit. The header includes, following a legacy short training field, a legacy long training field, and a legacy signal field, (i) a first signal field including a station identifier and (ii) a second signal field including a color value of the basic service set of the access point.

In another feature, the station identifier includes nine bits of the first signal field. The color value includes four or more bits of the second signal field.

In another feature, the access point further comprises a header generating module configured to generate a header for a physical layer protocol data unit. The header includes, following a legacy short training field, a legacy long training field, and a legacy signal field, (i) a first signal field including a first portion of a station identifier and a color value of the basic service set of the access point and (ii) a second signal field including a second portion of the station identifier.

In another feature, the first portion of the station identifier includes five bits of the first signal field and four bits of the second signal field. The color value includes four bits of the first signal field.

In another feature, the access point further comprises a color selecting module configured to select a first color value for the basic service set of the access point. The first color value includes a second color value used by a second basic service set that does not overlap the basic service set of the access point.

In other features, the access point further comprises an energy detecting module, a state determining module, and a backoff module. The energy detecting module is configured to detect an energy level in the medium. The state determining module is configured to determine that the medium is idle in response to the detected energy level being less than a lowest clear channel assessment threshold. The backoff module is configured to decrement a backoff counter by one in response to the medium (i) changing state from busy to idle for an arbitration interframe space or an extended interframe space of a packet and (ii) being idle for an additional slot, and decrement the backoff counter by one in response to the medium being idle for a slot after a prior slot in which the medium is idle. The transmit module is configured to transmit a frame in response to the backoff counter having a zero value.

In other features, the access point further comprises a color detecting module, an energy detecting module, a state determining module, and a backoff module. The color detecting module is configured to detect a first color value in a packet detected in the medium. The energy detecting module is configured to detect an energy level in the medium. The state determining module is configured to determine that the medium is idle in response to (i) the detected energy level being greater than a lowest clear channel assessment threshold and less than a currently used clear channel assessment threshold and (ii) the first color value being different than a second color value of the basic service set of the access point. The backoff module is configured to decrement a backoff counter by one in response to the medium being idle state for a slot. The transmit module is configured to transmit a frame in response to the backoff counter having a zero value.

In another feature, the state determining module is configured to determine that the medium is busy in response to the detected energy level being greater than the currently used clear channel assessment threshold.

In other features, the receiving module is configured to receive from the first device (i) a received signal strength indicator generated based on a frame received by the first device from the access point or (ii) a difference between the received signal strength indicator and a signal-to-noise ratio for a target modulation and coding scheme of the first device. The access point further comprises a power control module configured to decrease, in response to the difference between the received signal strength indicator and the signal-to-noise ratio being greater than a currently used clear channel assessment threshold, a transmit power level of the access point based on (i) the currently used clear channel assessment threshold and (ii) the received signal strength indicator or the difference between the received signal strength indicator and the signal-to-noise ratio.

In other features, the receiving module is configured to determine (i) a received signal strength indicator of a frame received from the first device or (ii) a difference between the received signal strength indicator and a signal-to-noise ratio for a target modulation and coding scheme of the first device. The access point further comprises a power control module configured to decrease, in response to the difference between the received signal strength indicator and the signal-to-noise ratio being greater than a currently used clear channel assessment threshold, a maximum transmit power level for a basic service set of the access point based on (i) the currently used clear channel assessment threshold and (ii) the received signal strength indicator or the difference between the received signal strength indicator and the signal-to-noise ratio. The transmitting module is configured to transmit the maximum transmit power level for a basic service set of the access point.

In other features, the receiving module is configured to receive from the first device a received signal strength indicator generated based on a frame received by the first device from an overlapping basic service set, and the clear channel assessment module is configured to decrease a currently used clear channel assessment threshold in response to the received signal strength indicator being less than the currently used clear channel assessment threshold.

In other features, the receiving module is configured to determine a received signal strength indicator generated based on a frame received from an overlapping basic service set, and the clear channel assessment module is configured to decrease a currently used clear channel assessment threshold in response to the received signal strength indicator being less than the currently used the currently used clear channel assessment threshold.

In still other features, a method comprises receiving first information at an access point. The first information indicates whether a first device supports a dynamic clear channel assessment capability. The dynamic clear channel assessment capability includes an ability to dynamically change a clear channel assessment threshold in a frequency channel to detect whether a medium is idle or busy. The method further comprises generating second information in response to receiving the first information about the first device indicating whether the first device supports the dynamic clear channel assessment capability. The second information is based on the first information. The second information indicates a clear channel assessment method used by the access point in response to receiving the first information. The method further comprises transmitting the second information from the access point in response to receiving the first information about the first device indicating whether the first device supports the dynamic clear channel assessment capability. The second information is usable by one or more devices associated with the access point in a basic service set of the access point to select respective clear channel assessment procedures to detect whether the medium is idle or busy.

In other features, the first information indicates that the first device does not support the dynamic clear channel assessment capability, and the second information indicates to the one or more devices associated with the access point in the basic service set of the access point that the one or more first devices cease using dynamic clear channel assessment.

In another feature, the method further comprises transmitting the second information via an information element included in a beacon or a management frame.

In another feature, in response to the first device being a client station in the basic service set of the access point, the method further comprises receiving the first information via an information element included in an association request received from the client station in the basic service set of the access point.

In another feature, in response to the first device including a station or an access point in a neighboring basic service set that overlaps with the basic service set of the access point, the method further comprises receiving the first information about the first device from the one or more devices in the basic service set of the access point.

In other features, the method further comprises detecting whether the first device, including a station or an access point in a neighboring basic service set, is configured to operate (i) in a same frequency channel as the basic service set of the access point and (ii) without using the dynamic clear channel assessment capability. The neighboring basic service set overlaps with the basic service set of the access point. The method further comprises receiving the first information from the device detecting module.

In other features, the method further comprises indicating in the second information (i) a first period in a beacon interval of the access point in which the one or more devices in the basic service set of the access point having the dynamic clear channel assessment capability contend for access to the medium using dynamic clear channel assessment, and (ii) a second period in the beacon interval in which the one or more devices in the basic service set of the access point not having the dynamic clear channel assessment capability contend for access to the medium.

In another feature, the method further comprises indicating in the second information that the one or more devices in the basic service set of the access point having the dynamic clear channel assessment capability are to also contend for access to the medium during a time other than the first period (i) at a lower priority than the one or more devices not having the dynamic clear channel assessment capability and (ii) by using a clear channel assessment threshold of the one or more devices not having the dynamic clear channel assessment capability.

In other features, the method further comprises selecting a predetermined dynamic clear channel assessment threshold based on one or more of (i) dynamic clear channel assessment thresholds used by neighboring basic service sets and (ii) spatial reuse criteria. The method further comprises indicating in the second information to the one or more devices associated with the access point in the basic service set of the access point that the one or more first devices are to use the predetermined dynamic clear channel assessment threshold.

In another feature, the method further comprises selecting a frequency channel to operate the basic service set of the access point. The frequency channel is a same channel in which a neighboring basic service set operates using the dynamic clear channel assessment capability.

In another feature, the method further comprises selecting a different frequency channel in response to the first information indicating that the first device does not support the dynamic clear channel assessment capability.

In another feature, the method further comprises generating a header for a physical layer protocol data unit. The header includes, following a legacy short training field, a legacy long training field, and a legacy signal field, (i) a first signal field including a station identifier and (ii) a second signal field including a color value of the basic service set of the access point.

In another feature, the station identifier includes nine bits of the first signal field. The color value includes four or more bits of the second signal field.

In another feature, the method further comprises generating a header for a physical layer protocol data unit. The header includes, following a legacy short training field, a legacy long training field, and a legacy signal field, (i) a first signal field including a first portion of a station identifier and a color value of the basic service set of the access point and (ii) a second signal field including a second portion of the station identifier.

In another feature, the first portion of the station identifier includes five bits of the first signal field and four bits of the second signal field. The color value includes four bits of the first signal field.

In another feature, the method further comprises selecting a first color value for the basic service set of the access point. The first color value includes a second color value used by a second basic service set that does not overlap the basic service set of the access point.

In other features, the method further comprises detecting an energy level in the medium, and determining that the medium is idle in response to the detected energy level being less than a lowest clear channel assessment threshold. The method further comprises decrementing a backoff counter by one in response to the medium (i) changing state from busy to idle for an arbitration interframe space or an extended interframe space of a packet and (ii) being idle for an additional slot. The method further comprises decrementing the backoff counter by one in response to the medium being idle for a slot after a prior slot in which the medium is idle. The method further comprises transmitting a frame in response to the backoff counter having a zero value.

In other features, the method further comprises detecting a first color value in a packet detected in the medium, detecting an energy level in the medium, and determining that the medium is idle in response to (i) the detected energy level being greater than a lowest clear channel assessment threshold and less than a currently used clear channel assessment threshold and (ii) the first color value being different than a second color value of the basic service set of the access point. The method further comprises decrementing a backoff counter by one in response to the medium being idle state for a slot, and transmitting a frame in response to the backoff counter having a zero value.

In another feature, the method further comprises determining that the medium is busy in response to the detected energy level being greater than the currently used clear channel assessment threshold.

In other features, the method further comprises receiving from the first device (i) a received signal strength indicator generated based on a frame received by the first device from the access point or (ii) a difference between the received signal strength indicator and a signal-to-noise ratio for a target modulation and coding scheme of the first device. The method further comprises decreasing, in response to the difference between the received signal strength indicator and the signal-to-noise ratio being greater than a currently used clear channel assessment threshold, a transmit power level of the access point based on (i) the currently used clear channel assessment threshold and (ii) the received signal strength indicator or the difference between the received signal strength indicator and the signal-to-noise ratio.

In other features, the method further comprises determining (i) a received signal strength indicator of a frame received from the first device or (ii) a difference between the received signal strength indicator and a signal-to-noise ratio for a target modulation and coding scheme of the first device. The method further comprises decreasing, in response to the difference between the received signal strength indicator and the signal-to-noise ratio being greater than a currently used clear channel assessment threshold, a maximum transmit power level for a basic service set of the access point based on (i) the currently used clear channel assessment threshold and (ii) the received signal strength indicator or the difference between the received signal strength indicator and the signal-to-noise ratio. The method further comprises transmitting the maximum transmit power level for a basic service set of the access point.

In other features, the method further comprises receiving from the first device a received signal strength indicator generated based on a frame received by the first device from an overlapping basic service set. The method further comprises decreasing a currently used clear channel assessment threshold in response to the received signal strength indicator being less than the currently used clear channel assessment threshold.

In other features, the method further comprises determining a received signal strength indicator generated based on a frame received from an overlapping basic service set, and decreasing a currently used clear channel assessment threshold in response to the received signal strength indicator being less than the currently used the currently used clear channel assessment threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 7 is a flowchart of a method for performing dynamic clear channel assessment (CCA) and backoff procedures according to the present disclosure.

In the drawings, reference numbers may be reused to identify similar and/or identical elements.

DESCRIPTION

A dynamic clear channel assessment (CCA) capability includes an ability to dynamically change a CCA level (i.e., CCA threshold) in a frequency channel to detect whether a medium is idle or busy. As explained below in detail, dynamically setting CCA levels (thresholds) can increase chances of simultaneous transmissions while minimizing collisions among neighboring basic service sets (BSSs). Additionally, assigning different color values to different BSSs can help avoid simultaneous transmissions in a BSS to reduce collisions. In BSSs that include devices having dynamic CCA capabilities and that use BSS coloring, legacy devices (AP/STA) may not get an opportunity to transmit frames since the legacy devices lack dynamic CCA capabilities and since the legacy devices use lower CCA levels to contend access to the medium.

Therefore, the present disclosure proposes adding a subfield to a header of a packet transmitted by an access point (AP) and a client station (STA) to indicate whether the AP/STA has dynamic CCA capability. For example, an information element (IE) called an Extended Capabilities IE may be added to the header of a packet transmitted by the AP/STA. When a legacy device without dynamic CCA capability is detected in a BSS of an AP (or in a neighboring BSS), the AP can inform all client stations associated with the AP in its BSS to not use dynamic CCA capability. Alternatively, the AP can include two different time periods in its beacon interval: a first period called a dynamic CCA period in which devices having dynamic CCA capability contend access to the medium, and a second period called a normal period in which devices without dynamic CCA capability contend access to the medium. Legacy devices can contend access to the medium at any time. Additional options for accessing the medium are discussed below in further detail.

In addition, as explained below in detail, channel selection rules may be used for a BSS supporting dynamic CCA capability to minimize collisions. A new PPDU (PHY protocol data unit) header format is proposed to increase the number of color values by increasing the number of bits used to indicate the color values in signal fields and by also reusing color values in some situations, as explained below in detail. In addition, novel backoff procedures and transmit power control procedures are proposed and explained below in detail.

Figure 1:
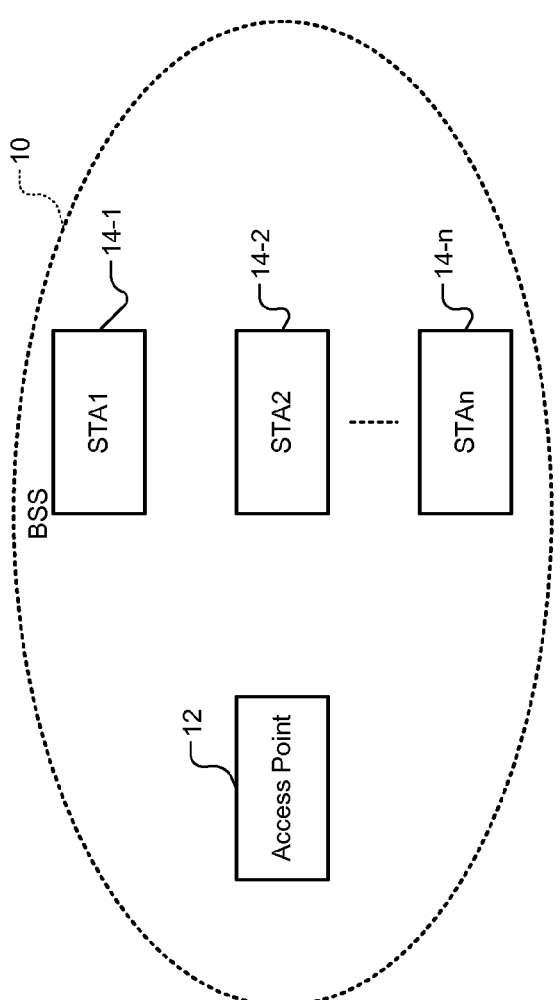
FIG. 1 depicts a basic service set (BSS) including an access point (AP) and a plurality of client stations (STAs).

FIG. 1 shows a basic service set (BSS) 10. The BSS 10 includes an access point (AP) 12. Additionally, the BSS 10 includes a plurality of client stations STA1 14-1, STA2 14-2, . . . , and STAn 14-*n*, where n is an integer greater than one (collectively STAs 14). The BSS 10 is part of a high-efficiency wireless local area network (HEW). Accordingly, the AP 12 may also be referred to as HEW AP 12. The STAs 14 may include HEW STAs 14 as well as one or more legacy STAs. While HEW devices such as the AP 12 and the STAs 14 typically support dynamic CCA capability, one or more HEW devices in the BSS 10 may not support dynamic CCA capability. Hereinafter, unless stated otherwise, a device such as the AP 12 and the STAs 14 is presumed to support dynamic CCA capability.

Figure 2:
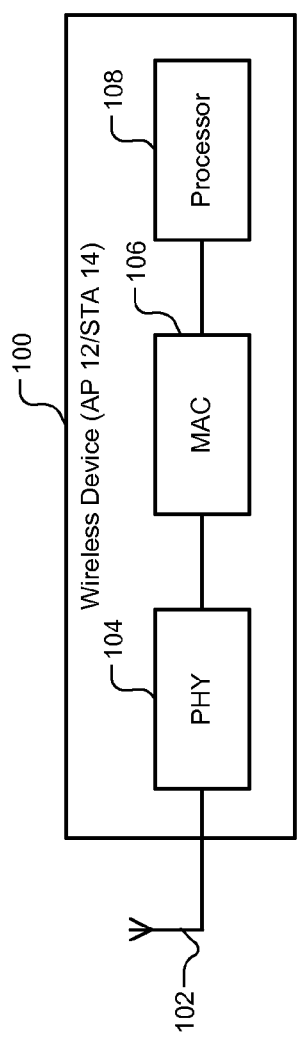
FIG. 2 is a block diagram of a wireless device (e.g., the AP or the STA of FIG. 1).

FIG. 2 shows a wireless device 100 (e.g., the AP 12 or the STA 14) including an antenna 102, a physical layer (PHY) 104, a medium access controller (MAC) 106, and a processor 108. While a single antenna 102 is shown, the wireless device 100 may include a plurality of antennas. For example, the plurality of antennas may be arranged in a multiple-input multiple-output (MIMO) configuration. The PHY 104 interfaces the wireless device 100 with the medium via the antenna 102. The MAC 106 controls access by the wireless device 100 to the medium. The processor 108 processes packets that are received and that are to be transmitted via the antenna 102.

Figure 3:
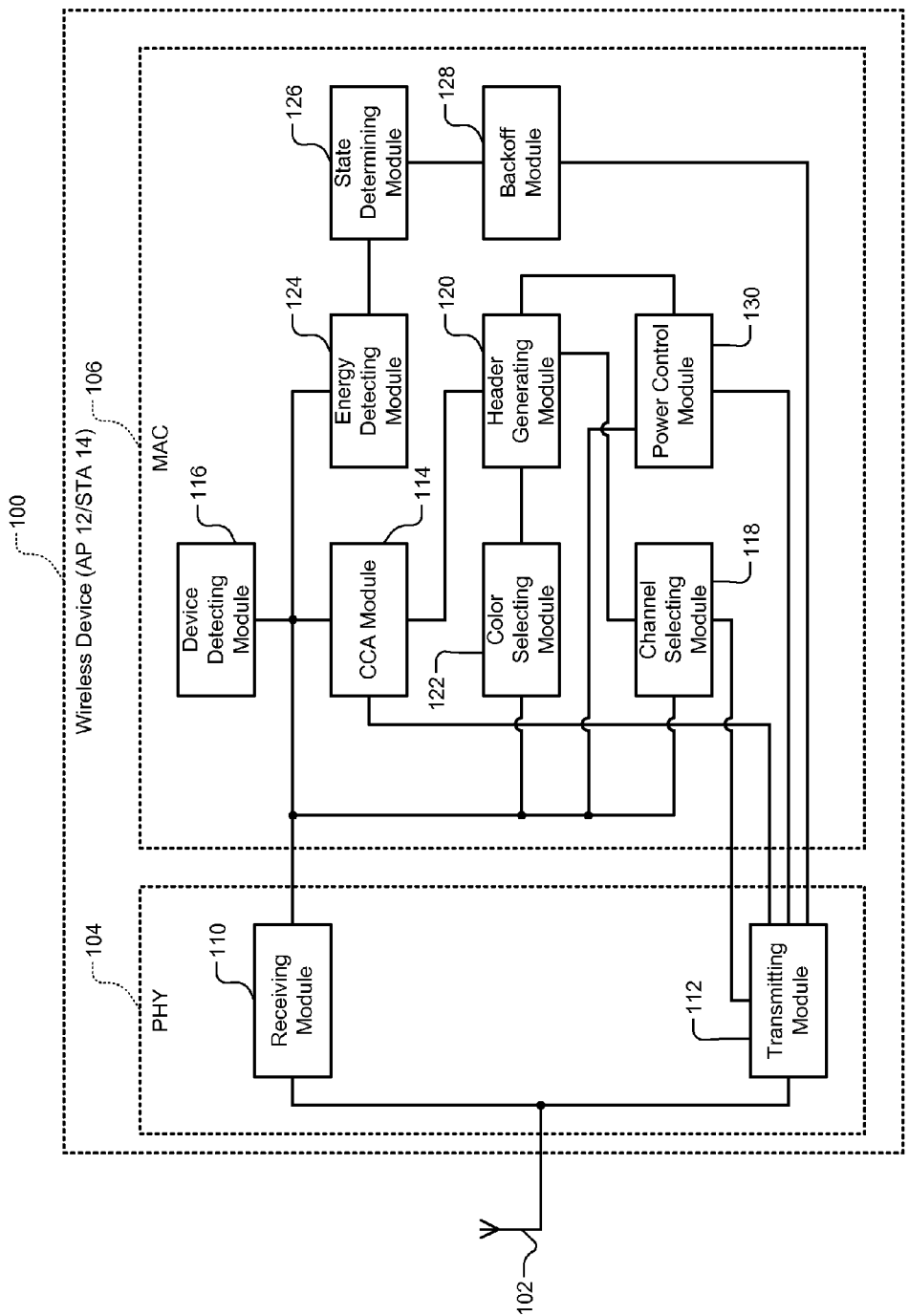
FIG. 3 is a detailed block diagram of the wireless device of FIG. 2.

FIG. 3 shows the wireless device 100 (e.g., the AP 12 or the STA 14) in further detail. The PHY 104 includes a receiving module 110 and a transmitting module 112. The receiving module 110 receives packets via the antenna 102. The transmitting module 112 transmits packets via the antenna 102. The MAC 106 includes a CCA module 114, a device detecting module 116, a channel selecting module 118, a header generating module 120, a color selecting module 122, an energy detecting module 124, a state determining module 126, a backoff module 128, and a power control module 130. In some implementations, one or more modules of the PHY 104 may be included in the MAC 106 while one or more modules of the MAC 106 may be included in the PHY 104.

The modules of the wireless device 100 perform operations described below for both an access point and client station (i.e., regardless of whether the wireless device 100 is implemented as the AP 12 or the STA 14) except where the description of a module specifically states that the module performs the described operations only for an access point (i.e., only when the wireless device 100 is implemented as the AP 12) or only for a client station (i.e., only when the wireless device 100 is implemented as the STA 14). As the following description clarifies, some modules (e.g., the color selecting module 122) may perform some operations (e.g., selecting a color value for the BSS 10) only in an access point (i.e., only when the wireless device 100 is implemented as the AP 12) and not in a STA (e.g., the color selecting module 122 may only detect color values of BSSs in the STA 14 and may not select a color value for the BSS 10 since selecting a color value for the BSS 10 is exclusive to the AP 12).

When the wireless device 100 is implemented as the AP 12, the receiving module 110 is configured to receive a first information from a first device indicating whether the first device supports dynamic CCA capability. The first device may be one of the STAs 14 in the BSS 10, or the first device may be an AP/STA in a neighboring BSS. Examples of the first information include the following. For example, in a high-efficiency wireless local area network (HEW), the AP 12 or the STA 14 can include a subfield in a management frame body (e.g., an extended capabilities information element (IE)) to indicate whether the AP 12 or the STA 14 supports dynamic CCA capability. A legacy device (AP/STA) will not support dynamic CCA capability and will therefore not include such a subfield in its management frame body. Accordingly, the receiving module 110 of the AP 12 can receive the first information in many ways. For example, the receiving module 110 of the AP 12 may receive the first information via an association request received from the first device, which may include a legacy STA or a HEW STA without dynamic CCA capability in the BSS 10.

The CCA module 114 of the AP 12 is configured to generate second information in response to the receiving module 110 receiving the first information from the first device, where the first information indicates whether the first device supports dynamic CCA capability. The CCA module 114 of the AP 12 generates the second information based on the first information. The second information indicates a CCA method that will be used by the AP 12 and by the STAs 14 in the BSS 10 in response to receiving the first information from the first device.

For example, if the first information received from the first device indicates that the first device does not support dynamic CCA capability, the second information generated by the CCA module 114 of the AP 12 may indicate that a device without dynamic CCA capability exists in the BSS 10. The transmitting module 112 of the AP 12 may transmit the second information via a beacon or other management frame transmitted by the AP 12. The STAs 14 in the BSS 10 will not use dynamic CCA upon receiving the second information from the AP 12.

As another example, the receiving module 110 of the AP 12 may receive the first information in another manner. An AP/STA in the BSS 10 that supports dynamic CCA capability may detect whether an AP/STA without dynamic CCA capability exists in an overlapping BSS (OBSS). In this example, the device detecting module 116 of the AP 12 is configured to obtain the first information by detecting whether the first device, which may include an AP/STA without dynamic CCA capability, exists in the OBSS and is configured to operate in the same frequency channel as the BSS 10. Alternatively, the device detecting module 116 of the STA 14 may perform similar operations, and the STA 14 may transmit to the AP 12 a report including the detection of the first device (i.e., the first information) in the OBSS.

When the AP 12 detects the first device as above or receives the report from the STA 14 as above, the CCA module 114 of the AP 12 generates the second information based on the first information. The second information indicates a CCA method that will be used by the AP 12 in response to receiving the first information about the first device. For example, if the first information about the first device indicates that the first device does not support dynamic CCA capability, the second information generated by the CCA module 114 of the AP 12 may indicate that a device without dynamic CCA capability exists in an OBSS. The transmitting module 112 of the AP 12 may transmit the second information via a beacon or other management frame transmitted by the AP 12. The STAs 14 in the BSS 10 will not use dynamic CCA upon receiving the second information from the AP 12.

Figure 4:
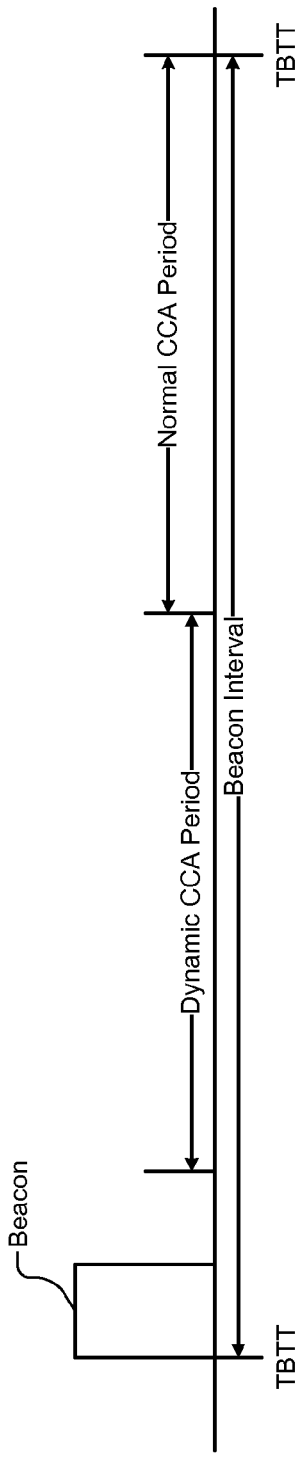
FIG. 4 depicts a beacon interval including two different time periods for devices with and without dynamic clear channel assessment (CCA) capability in a BSS for contending access to medium.

In some implementations, the AP 12 may use options other than not using dynamic CCA capability at all in the BSS 10 in response to detecting a device without dynamic CCA capability either in the BSS 10 or in an OBSS. For example, the CCA module 114 of the AP 12 may generate the second information based on the first information about the first device as follows. The second information may indicate that a beacon interval of the AP 12 includes two time periods as shown in FIG. 4: a first period called a dynamic CCA period in which STAs 14 having dynamic CCA capability contend for access to the medium using dynamic CCA, and a second period called a normal CCA period in which STAs 14 without dynamic CCA capability contend for access to the medium. The transmitting module 112 of the AP 12 may transmit the second information via a beacon or other management frame transmitted by the AP 12 to the STAs 14. The STAs 14 having dynamic CCA capability may also contend for access to the medium during times other than the first period (i) at a lower priority than the STAs 14 without dynamic CCA capability and (ii) by using a CCA level of the STAs 14 without dynamic CCA capability. The STAs 14 without dynamic CCA capability (e.g., legacy STAs) can only contend for access to the medium during the second period, or optionally, at any time.

In some implementation, the AP 12 may select a specific dynamic CCA level for the STAs in its BSS. Multiple BSSs in a management WLAN network, e.g., enterprise WLAN network may also use a specific dynamic CCA level. An access server or WLAN administrator can decide the specific CCA level of the BSSs. The selection rules may be based on the spatial reuse requirement or other criteria.

The channel selecting module 118 of the AP 12 is configured to select a frequency channel in which to operate the BSS 10 using the following rule, for example. If the AP 12, which supports dynamic CCA capability, needs to start the BSS 10 that occupies some or all channels on any existing BSSs, the channel selecting module 118 of the AP 12 should first select a frequency channel in which a neighboring BSS supports dynamic CCA. If the AP 12 detects (e.g., based on the first information) a legacy BSS or HEW BSS without dynamic CCA capability in the frequency channel, the channel selecting module 118 of the AP 12 may then select a different frequency channel.

The following discussion relates to redefining signal fields in IEEE 802.11ax PPDU header to increase the number of bits used to indicate BSS color values and to increase the number of bits used to indicate a partial association identifier (PAID) of a STA. In IEEE 802.11ah standard, three bits of PAID are used to indicate a color value of a BSS, and six bits of PAID are used for STA identification. Three bits, however, can indicate only up to eight color values that can be used by only up to eight BSSs. Further, with only six bits of PAID to identify STAs, chances of more than one STA having the same PAID can increase.

Further, in IEEE 802.11ac standard, a signal field SIG-B is used to indicate a length of an aggregate medium access control (MAC) protocol data unit (A-MPDU). However, a signal field L-SIG already indicates a length of a physical layer convergence procedure (PLCP) protocol data unit (PPDU), and an A-MPDU delimiter already indicates an A-MPDU length in bytes. Therefore, the length information in the signal field SIG-B is redundant. Accordingly, in a high-efficiency wireless local area network (HEW), color values of BSSs and PAID can be independently coded by redefining signal fields SIG-A and SIG-B according to the present disclosure as follows.

Figure 5:
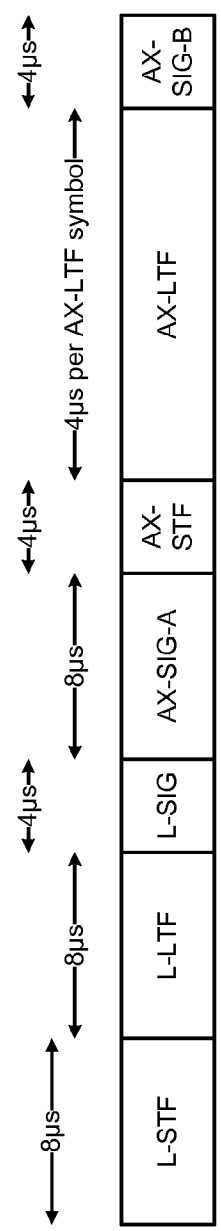
FIG. 5 depicts a mixed mode header format including legacy fields and IEEE 802.11ax signal fields that are redefined to indicate a color value of a BSS and a partial association identifier (PAID) of a client station.

The header generating module 120 of the AP 12 is configured to generate a header for a PPDU as shown in FIG. 5. The header shown in FIG. 5 is an example of a mixed mode PHY header that can be used in packets compliant with IEEE 802.11ax standard. The header includes legacy fields followed by fields specified by IEEE 802.11ax standard that are modified as follows. The legacy fields include a legacy short training field (L-STF), a Legacy long training field (L-LTF), and a Legacy signal field (L-SIG). Following the legacy fields are: a first signal field (AX-SIG-A) (modified as described below), a short training field (AX-STF), a long training field (AX-LTF), and a second signal field (AX-SIG-B) (also modified as described below). The first signal field AX-SIG-A and the second signal field AX-SIG-B are modified according to the present disclosure as follows. AX-STF and AX-LTF may also not be included between AX-SIG-A and AX-SIG-B.

In one implementation, the STA identification (PAID) can be included in the first signal field AX-SIG-A, for example, by using up to nine bits of the first signal field AX-SIG-A. BSS color values can be included in the second signal field AX-SIG-B, for example, by using at least four bits of the second signal field AX-SIG-B. in another implementation, a first portion of PAID, for example, up to five bits of PAID, and four BSS color bits, for example, may be included in the first signal field AX-SIG-A; and a second portion of PAID, for example, up to four bits of PAID, may be included in the second signal field AX-SIG-B.

In some implementations, the header generating module 120 may also generate PPDUs transmitted by the wireless device 100. For example, the header generating module 120 may be part of (i.e., may be included in) a PPDU generating module that generates PPDUs. In addition, the header/PPDU generating module may also include information generated by at least the CCA module 114, the channel selecting module 118, the color selecting module 122, and the power control module 130 (the last two modules are described below in detail) in a header of a PPDU or other portions of the PPDU transmitted by the wireless device 100. Additionally, the header/PPDU generating module may also include the extended capabilities information element in a frame body of a management frame or other portions of the PPDU transmitted by the wireless device 100 to indicate whether the wireless device 100 supports the dynamic CCA capability.

The color selecting module 122 of the AP 12 is configured to select a color value for the BSS 10. Typically, an AP transmits its color value and the color values that it cannot use in beacon frames. For example, when a color is selected by a neighboring BSS, the AP cannot use the color value selected by the neighboring BSS. The present disclosure provides a novel way of reusing a color value used by a non-overlapping BSS as explained below.

Figure 6:
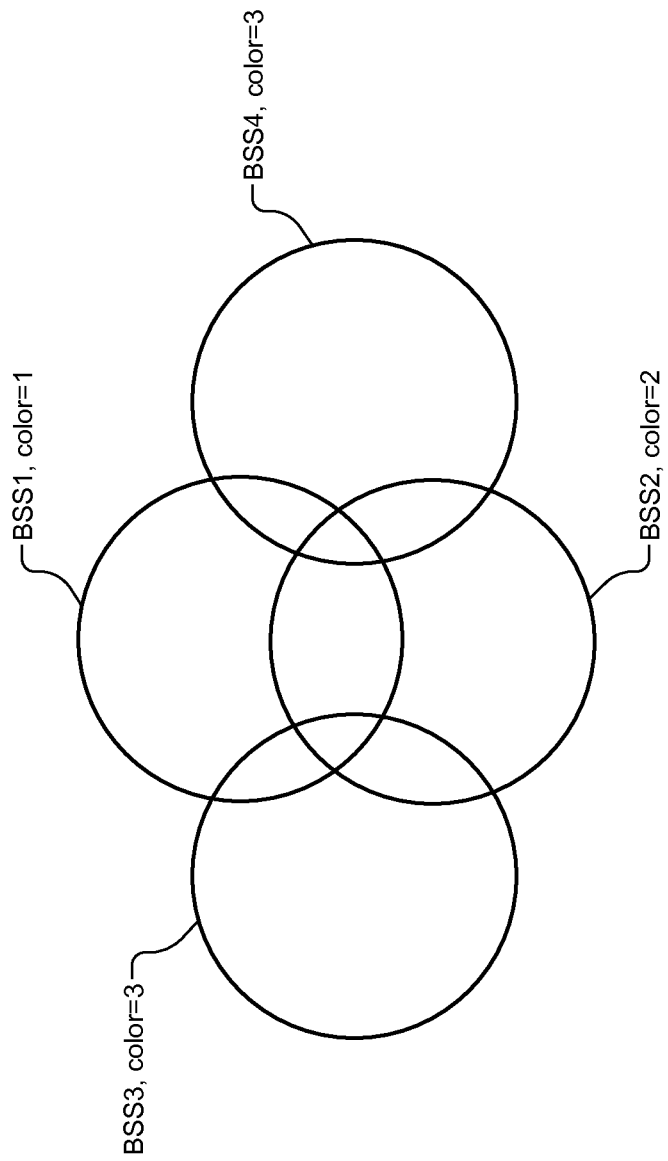
FIG. 6 depicts a plurality of BSSs, where a BSS can reuse a color value of a non-overlapping BSS.

For example, FIG. 6 shows a plurality of BSSs. BSS4 selects its color value according to the present disclosure as follows. Since BSS1, BSS2, and BSS3 have respectively selected color values 1, 2, and 3, BSS4 may normally select 4 as its color value. Instead, according to the present disclosure, BSS4 may select or reuse 3 as its color value although BSS3 has already selected 3 as its color value. BSS4 may select the same color value as BSS3 because BSS3 does not overlap with BSS4. BSS4, however, overlaps with BSS1 and BSS2 and therefore cannot reuse color values selected by BSS1 and BSS2. Accordingly, when an AP selects a color value for its BSS, the color value that cannot be used by its neighboring BSS and that can be used by the AP may be selected first.

Depending on whether the color selecting module 122 is implemented in the AP 12 or the STAs 14, the color selecting module 122 can perform one or both operations: selecting a color value of the BSS 10, and detecting color values of one or more BSSs. In other words, the color selecting module 122 can also operate as a color detecting module in the AP 12 and the STAs 14. In the STAs 14, the color selecting module 122 may operate only as a color detecting module since only the AP 12 can select color values for the BSS 10 and since the STAs 14 can only detect color values of the BSS 10 and of neighboring BSSs.

The following discussion relates to novel backoff procedures that can be used when dynamic CCA capability and BSS coloring are used. Generally, a PHY detects whether medium is idle or busy based on the selected CCA level (threshold). When the medium changes from busy to idle for an arbitration interframe space (AIFS) or for an extended interframe space (EIFS) in a packet, and the medium is idle for an additional slot, a backoff counter can be decreased by 1. When the medium is idle for a slot after the previous idle slot, the backoff counter can be decreased by 1. When the backoff counter becomes zero, the MAC can transmit a frame.

With dynamic CCA and BSS coloring, when the PHY indicates that the medium is idle according to the selected CCA level, the MAC still cannot decrease the backoff counter in some cases, for example, before decoding the signal field AX-SIG-A (see FIG. 5). Accordingly, before determining that the transmission is from the same BSS, the medium may be idle for about three slots or longer.

According to the present disclosure, the backoff module 128 uses a backoff counter for each access category (AC) (e.g., voice, video, email, etc.). The energy detecting module 124 module is configured to detect an energy level in a primary frequency channel. The state determining module 126 is configured to determine that the medium is idle when the detected energy level is less than the lowest CCA level (e.g., below −82 dBm). When a STA wakes up, the STA needs to wait for a maximum PPDU length or decode a PPDU from the BSS before starting backoff procedure. The backoff module 128 is configured to decrement the backoff counter by 1 when the medium changes state from busy to idle for an AIFS or for an EIFS, and when the medium is idle for an additional slot. The backoff module 128 is configured to decrement the backoff counter by 1 when the medium is idle for a slot after the previous idle slot. The transmitting module 112 is configured to transmit a frame when the backoff counter is zero. In a dynamic CCA period, a longer IFS than AIFS[AC] for respective access categories may be used during backoff procedure.

Alternatively, the backoff procedure according to the present disclosure may be performed as follows. The state determining module 126 determines that the medium is idle when the energy detecting module 124 detects that the energy level in the primary frequency channel is greater than the lowest CCA level (e.g., higher than −82 dBm) and less than a currently used dynamic CCA level, and when the detected BSS color (or BSSID) in the transmission is not the same as the color value of the BSS 10 (or the associated AP 12's BSSID) (i.e., when the transmission is not from within the BSS 10). The backoff module 128 is configured to decrement the backoff counter by 1 when the medium is idle for a slot. The transmitting module 112 is configured to transmit a frame when the backoff counter is zero. The state determining module 126 determines that the medium is busy when the energy detecting module 124 detects that the energy level in the primary frequency channel is greater than the currently used dynamic CCA level. The wireless device 100 backs off and does not transmit when the medium is busy.

The following discussion relates to transmit power control according to the present disclosure. Selecting a higher dynamic CCA level can increase collisions. Therefore, an AP and its associated STAs in its BSS that support dynamic CCA capability need to use transmit power control to decrease the transmit power in order to reduce interference to an OBSS when exploring spatial reuse. The assumption of a dynamic CCA level is that it is an interference level (noise) that the BSS can tolerate for simultaneous transmission. The transmit power control and the selection of the dynamic CCA level from a plurality of CCA levels or thresholds can be performed in different ways according to the present disclosure as follows.

Suppose that a STA 14 receives frames from its associated AP 12 in the BSS 10. The STA 14 (e.g., the receiving module 110 of the STA 14) determines a received signal strength indicator (RSSI) of a received frame. The STA 14 may use averaging over multiple frames. The STA 14 knows the signal-to-noise ratio (SNR) for a target modulation and coding scheme (MCS) that the STA 14 uses to transmit packets. For example, the SNR for the target MCS may be selected by the STA 14 or may be assigned by the AP 12. The STA 14 determines a difference between the received frame's RSSI and the SNR for the target MCS. The STA 14 (e.g., the transmitting module 112 of the STA 14) may transmit the difference or the RSSI to the AP 12.

The receiving module 110 of the AP 12 receives the difference or the RSSI from the STA 14. The power control module 130 of the AP 12 adjusts (e.g., decreases) the transmit power level of the AP 12 when the difference is greater than a currently used dynamic CCA level (e.g., by 80%). For example, the power control module 130 of the AP 12 may decrease the transmit power level of the AP 12 by a value equal to ((received frame's RSSI—SNR for target MCS)—currently used dynamic CCA level). The transmitting module 112 of the AP 12 may transmit the new transmit power level to the STAs 14 in the BSS 10 via beacon or management frames. The STAs 14 also decrease their transmit power levels by the same value as the AP 12 or set their transmit power levels equal to the new transmit power level received from the AP 12.

Alternatively, the AP 12 may receive frames from its associated STAs 14. The receiving module 110 of the AP 12 may determine a received signal strength indicator (RSSI) of a received frame. The AP 12 may use averaging over multiple frames. The AP 12 knows the signal-to-noise ratio (SNR) for a target modulation and coding scheme (MCS) that the STA 14 uses to transmit packets. For example, the SNR for the target MCS may be assigned by the AP 12 or may be selected by the STA 14. The receiving module 110 of the AP 12 determines a difference between the received frame's RSSI and the SNR for the target MCS.

The power control module 130 of the AP 12 adjusts (e.g., decreases) a maximum transmit power level of the BSS 10 when the difference is greater than a currently used dynamic CCA level (e.g., by 80%). For example, the power control module 130 of the AP 12 may decrease the maximum transmit power level of the BSS 10 by a value equal to ((received frame's RSSI—SNR for target MCS)—currently used dynamic CCA level). The transmitting module 112 of the AP 12 may transmit the new transmit power level it uses to the STAs 14 in the BSS 10 via beacon or management frames. The STAs 14 also decrease their transmit power levels by the same value as the AP 12 or set their transmit power levels equal to the new transmit power level received from the AP 12.

The AP 12 can adjust or select a different dynamic CCA level based on RSSI of frames received from an OBSS by the STA 14 or by the AP 12 as follows. Suppose that a STA 14 in the BSS 10 receives frames from an AP/STA in an OBSS. The STA 14 (e.g., the receiving module 110 of the STA 14) determines a received signal strength indicator (RSSI) of one or more received frames (e.g., by averaging). The STA 14 (e.g., the transmitting module 112 of the STA 14) may transmit the RSSI to the AP 12. The CCA module 114 of the AP 12 can adjust (e.g., decrease) a currently used dynamic CCA level based on the RSSI if the RSSI is less than the currently used dynamic CCA level (e.g., by a percentage). The transmitting module 112 of the AP 12 may transmit the new dynamic CCA level to the STAs 14 in the BSS 10 via beacon or management frames.

Alternatively, the AP 12 may receive frames from an AP/STA in an OBSS. The AP 12 (e.g., the receiving module 110 of the AP 12) determines a received signal strength indicator (RSSI) of one or more received frames (e.g., by averaging). The CCA module 114 of the AP 12 can adjust (e.g., decrease) a currently used dynamic CCA level based on the RSSI if the RSSI is less than the currently used dynamic CCA level (e.g., by a percentage). The transmitting module 112 of the AP 12 may transmit the new dynamic CCA level to the STAs 14 in the BSS 10 via beacon or management frames.

FIG. 7 shows a method 200 for performing dynamic clear channel assessment (CCA) and backoff procedures according to the present disclosure. The method 200 also includes selecting frequency channel and BSS color value, indicating BSS color value and PAID, controlling transmit power, and selecting dynamic CCA levels. The method 200 can be performed by a wireless device such as the wireless device 100 shown in FIGS. 2 and 3. Some of the steps in the method 200 may be specific to an AP and may not be performed by a STA as explained above with reference to FIG. 3.

At 202, a wireless device such as an access point or a client station that has dynamic CCA capability may indicate its support for such a capability by including a new information element (IE) in a portion of a packet transmitted by the wireless device (e.g., in a sub-field in a header).

At 204, the wireless device may learn in one of various ways if another device (e.g., a first device) without dynamic CCA capability exists in a BSS of the wireless device. For example, an access point in the BSS may receive an association request from the first device, which may include a legacy device or another device without dynamic CCA capability. The association request may include the new information element transmitted by the first device. The new information element may indicate that the first device lacks dynamic CCA capability. Alternatively, a client station in the BSS may be able to detect whether a client station or an AP without dynamic CCA capability exists in an OBSS operating in the frequency channel of the BSS. When a client station in the BSS detects such a device, the client station reports the detection to its associated AP in the BSS. The AP in the BSS also may be able to detect on its own whether a client station or an AP without dynamic CCA capability exists in an OBSS operating in the frequency channel of the BSS. In all of the above scenarios, the AP in the BSS transmits an indication in a beacon or other management frame to all the devices in the BSS that a device without dynamic CCA capability exists in the BSS itself or in a neighboring BSS.

At 206, when a device without dynamic CCA capability exists in the BSS or in a neighboring BSS, the AP in the BSS does not use dynamic CCA anymore. Upon receiving the indication from the AP, the client stations in the BSS also do not use dynamic CCA. In some implementations, instead of not using dynamic CCA at all when a device without dynamic CCA capability is detected in the BSS or in a neighboring BSS, the AP may provide two time periods in its beacon interval, as follows: (i) in a first time period, which may also be called a dynamic CCA time period, devices with dynamic CCA capability may contend for access to the medium, and (ii) in a second time period, which may also be called a normal CCA time period, devices without dynamic CCA capability may contend for access to the medium. Devices with dynamic CCA capability may also contend for access to the medium during times other than the first period at a lower priority than devices without CCA capability and by using a normal CCA level used by the devices without CCA capability. Devices without dynamic CCA capability and legacy devices may contend for access to the medium at any time.

At 208, if an AP with dynamic CCA capability needs to start a BSS that occupies some or all channels on any existing BSSs, the AP first selects a channel in which a neighboring BSS supports dynamic CCA capability. If the AP detects a device without dynamic CCA capability in the selected channel, the AP may then change the channel to another channel.

At 210, the AP may indicate a color value of the BSS and PAID by redefining the following signal fields of IEEE 802.11ax standard in a mixed mode PHY header: a first signal field, AX-SIG-A; and the second signal field, AX-SIG-B. These signal fields are located in the header following the legacy short and long training fields (L-STF and L-LTF) and signal field (L-SIG). For example, the AP may use nine bits of the first signal field AX-SIG-A to indicate PAID and four or more bits of the second signal field AX-SIG-B to indicate BSS color value. Alternatively, the AP may use up to five bits of the first signal field AX-SIG-A to indicate a first portion of PAID and four or more bits of the first signal field AX-SIG-A to indicate a BSS color value. The AP may use up to four bits of the second signal field AX-SIG-B to indicate a second portion of PAID.

At 212, the AP may transmit in beacon frames its color value and the color values that the AP cannot use. For example, the AP cannot use the color value selected by a neighboring BSS. When the AP selects a color value for its BSS, the color value that cannot be used by its neighboring BSS and can be used by itself should be first selected. For example, the AP can reuse a color value selected by a non-overlapping BSS as the color value for its BSS.

At 214, the wireless device (i.e., both an AP and a STA) uses a backoff counter for each access category. When the energy detected in a primary channel is below a lowest dynamic CCA level in the primary channel, the medium is considered idle. When a client station wakes up, the client station needs to wait for a maximum packet length or decode a packet from the BSS before starting backoff procedure. When the medium changes from busy to idle for an AIFS or EIFS and when the medium is idle for an additional slot, the backoff counter can be decreased by 1. When the medium is idle for a slot after the previous idle slot, the backoff counter can be decreased by 1. In a dynamic CCA period, a longer IFS than AIFS[AC] for respective access categories may be used during backoff procedure.

Alternatively, when the energy detected in the primary channel is higher than a lowest dynamic CCA level in the primary channel and is lower than a currently used dynamic CCA level, and when the detected BSS color value (or BSSID) is not the same as the associated BSS color value (or the associated AP's BSSID), the medium is considered idle. When the medium is idle for a slot, the backoff counter can be decreased by 1. If the energy level detected in the primary channel is higher than the currently used dynamic CCA level in the primary channel, the medium is considered busy. The wireless device backs off when the medium is busy and transmits when the medium is idle.

At 216, the AP may control its transmit power level and the transmit power levels of other devices in the BSS in many ways as follows. For example, a client station in the BSS may receive frames from its associated AP in the BSS. The client station may determine RSSI of one or more frames received from the AP (e.g., using averaging). The client station may determine a difference between the RSSI and a value of signal-to-noise ratio (SNR) for a target modulation and coding scheme (MCS). The client station may report the RSSI or the difference between the RSSI and the SNR to the AP. The AP may decrease its transmit power level by a value equal to ((RSSI−SNR)−currently used dynamic CCA level)). The AP may announce the new decreased transmit power level via a beacon or management frame to other devices in the BSS. The other devices in the BSS may also decrease their transmit power levels by the same value as the AP.

Alternatively, the AP may receive frames from its associated STAs in the BSS. The AP may determine RSSI of one or more frames received from one or more STAs (e.g., using averaging). The AP may determine a difference between the RSSI and a value of signal-to-noise ratio (SNR) for a target modulation and coding scheme (MCS). The AP may decrease a maximum transmit power level of its BSS by a value equal to ((RSSI−SNR)−currently used dynamic CCA level)). The AP may announce the new decreased transmit power level it uses via a beacon or management frame to other devices in the BSS. The other devices in the BSS may also decrease their transmit power levels by the same value as the AP.

At 218, the AP can adjust or select a different dynamic CCA level based on RSSI of frames received from an OBSS as follows. Suppose that a client station in the BSS receives frames from an AP/STA in an OBSS. The client station determines RSSI of one or more received frames (e.g., by averaging). The client station may transmit the RSSI to the AP. The AP can adjust (e.g., decrease) the currently used dynamic CCA level based on the RSSI if the RSSI is less than the currently used dynamic CCA level (e.g., by a percentage). Alternatively, the AP may receive frames from an AP/STA in an OBSS. The AP may determine RSSI of one or more received frames (e.g., by averaging). The AP can adjust (e.g., decrease) the currently used dynamic CCA level based on the RSSI if the RSSI is less than the currently used dynamic CCA level (e.g., by a percentage). The AP may transmit the new dynamic CCA level to the STAs in the BSS via beacon or management frames.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. An access point comprising:
a receiver of the access point configured to receive a first information from a first device communicating with the access point via a medium, the first information received from the first device indicating whether the first device supports a dynamic clear channel assessment capability, wherein the dynamic clear channel assessment capability includes an ability to dynamically change a clear channel assessment threshold in a frequency channel to detect whether the medium is idle or busy;
a controller of the access point configured to generate a second information in response to receiving the first information from the first device indicating whether the first device supports the dynamic clear channel assessment capability, wherein the second information is based on the first information received from the first device, and wherein the second information indicates a method for clear channel assessment being used by the access point in response to receiving the first information from the first device;
a transmitter of the access point configured to transmit the second information to one or more devices associated with the access point in a basic service set of the access point in response to receiving the first information from the first device indicating whether the first device supports the dynamic clear channel assessment capability, wherein the second information is usable by the one or more devices associated with the access point in the basic service set of the access point to select a procedure for clear channel assessment to detect whether the medium is idle or busy;
wherein the second information indicates the method for clear channel assessment being used by the access point comprising:
a first period in a beacon interval of the access point in which the one or more devices in the basic service set of the access point having the dynamic clear channel assessment capability contend for access to the medium using dynamic clear channel assessment; and
a second period in the beacon interval in which the one or more devices in the basic service set of the access point not having the dynamic clear channel assessment capability contend for access to the medium; and
wherein the second information indicates the procedure for clear channel assessment that the one or more devices in the basic service set of the access point having the dynamic clear channel assessment capability also contend for access to the medium during a time other than the first period (i) at a lower priority than the one or more devices not having the dynamic clear channel assessment capability and (ii) by using a clear channel assessment threshold of the one or more devices not having the dynamic clear channel assessment capability to determine whether the medium is idle or busy; and
a channel selector configured to select a frequency channel to operate the basic service set of the access point, wherein the frequency channel is a same channel in which a neighboring basic service set operates using the dynamic clear channel assessment capability; and
wherein the channel selector is configured to select a different frequency channel in response to the first information indicating that the first device does not support the dynamic clear channel assessment capability.

2. The access point of claim 1, wherein:
the first information indicates that the first device does not support the dynamic clear channel assessment capability; and
the second information indicates to the one or more devices associated with the access point in the basic service set of the access point that the one or more first devices cease using dynamic clear channel assessment.

3. The access point of claim 1, wherein the transmitter is configured to transmit the second information via an information element included in a beacon or a management frame.

4. The access point of claim 1, wherein in response to the first device being a client station in the basic service set of the access point, the receiver is configured to receive the first information via an information element included in an association request received from the client station in the basic service set of the access point.

5. The access point of claim 1, wherein:
the first device includes a station or an access point in a neighboring basic service set that overlaps with the basic service set of the access point; and
the receiver is configured to receive the first information about the first device from the one or more devices in the basic service set of the access point.

6. The access point of claim 1, further comprising:
a device detector configured to detect whether the first device, including a station or an access point in a neighboring basic service set, is configured to operate (i) in a same frequency channel as the basic service set of the access point and (ii) without using the dynamic clear channel assessment capability, wherein the neighboring basic service set overlaps with the basic service set of the access point, and
wherein the receiver is configured to receive the first information from the device detector.

7. The access point of claim 1, wherein the second information indicates to the one or more devices associated with the access point in the basic service set of the access point that the one or more devices are to use a predetermined dynamic clear channel assessment threshold, and wherein the predetermined dynamic clear channel assessment threshold is selected based on one or more of (i) dynamic clear channel assessment thresholds used by neighboring basic service sets and (ii) spatial reuse criteria.

8. The access point of claim 1, further comprising a header generator configured to generate a header for a physical layer protocol data unit, wherein the header includes, following a legacy short training field, a legacy long training field, and a legacy signal field, (i) a first signal field including a station identifier and (ii) a second signal field including a color value of the basic service set of the access point.

9. The access point of claim 8, wherein the station identifier includes nine bits of the first signal field, and wherein the color value includes four or more bits of the second signal field.

10. The access point of claim 1, further comprising a header generator configured to generate a header for a physical layer protocol data unit, wherein the header includes, following a legacy short training field, a legacy long training field, and a legacy signal field, (i) a first signal field including a first portion of a station identifier and a color value of the basic service set of the access point and (ii) a second signal field including a second portion of the station identifier.

11. The access point of claim 10, wherein the first portion of the station identifier includes five bits of the first signal field and four bits of the second signal field, and wherein the color value includes four bits of the first signal field.

12. The access point of claim 1, further comprising:
a color selector configured to select a first color value for the basic service set of the access point,
wherein the first color value includes a second color value used by a second basic service set that does not overlap the basic service set of the access point.

13. The access point of claim 1, further comprising:
an energy detector configured to detect an energy level in the medium;
wherein the controller is configured to determine that the medium is idle in response to the detected energy level being less than a lowest clear channel assessment threshold; and
a backoff circuit configured to
decrement a backoff counter by one in response to the medium (i) changing state from busy to idle for an arbitration interframe space or an extended interframe space of a packet and (ii) being idle for an additional slot, and
decrement the backoff counter by one in response to the medium being idle for a slot after a prior slot in which the medium is idle; and wherein the transmitter is configured to transmit a frame in response to the backoff counter having a zero value.

14. The access point of claim 1, further comprising:
a color detector configured to detect a first color value in a packet detected in the medium;
an energy detector configured to detect an energy level in the medium;
wherein the controller is configured to determine that the medium is idle in response to (i) the detected energy level being greater than a lowest clear channel assessment threshold and less than a currently used clear channel assessment threshold and (ii) the first color value being different than a second color value of the basic service set of the access point; and
a backoff circuit configured to decrement a backoff counter by one in response to the medium being idle state for a slot,
wherein the transmitter is configured to transmit a frame in response to the backoff counter having a zero value.

15. The access point of claim 14, wherein the controller is configured to determine that the medium is busy in response to the detected energy level being greater than the currently used clear channel assessment threshold.

16. The access point of claim 1, wherein the receiver is configured to receive from the first device (i) a received signal strength indicator generated based on a frame received by the first device from the access point or (ii) a difference between the received signal strength indicator and a signal-to-noise ratio for a target modulation and coding scheme of the first device, the access point further comprising:
a power control circuit configured to decrease, in response to the difference between the received signal strength indicator and the signal-to-noise ratio being greater than a currently used clear channel assessment threshold, a transmit power level of the access point based on (i) the currently used clear channel assessment threshold and (ii) the received signal strength indicator or the difference between the received signal strength indicator and the signal-to-noise ratio.

17. The access point of claim 1, wherein the receiver is configured to determine (i) a received signal strength indicator of a frame received from the first device or (ii) a difference between the received signal strength indicator and a signal-to-noise ratio for a target modulation and coding scheme of the first device, the access point further comprising:
a power control circuit configured to decrease, in response to the difference between the received signal strength indicator and the signal-to-noise ratio being greater than a currently used clear channel assessment threshold, a maximum transmit power level for a basic service set of the access point based on (i) the currently used clear channel assessment threshold and (ii) the received signal strength indicator or the difference between the received signal strength indicator and the signal-to-noise ratio,
wherein the transmitter is configured to transmit the maximum transmit power level for a basic service set of the access point.

18. The access point of claim 1, wherein:
the receiver is configured to receive from the first device a received signal strength indicator generated based on a frame received by the first device from an overlapping basic service set; and
the controller is configured to decrease a currently used clear channel assessment threshold in response to the received signal strength indicator being less than the currently used clear channel assessment threshold.

19. The access point of claim 1, wherein:

the receiver is configured to determine a received signal strength indicator generated based on a frame received from an overlapping basic service set; and the controller is configured to decrease a currently used clear channel assessment threshold in response to the received signal strength indicator being less than the currently used the currently used clear channel assessment threshold.

* * * * *